United States Patent
Davies

(10) Patent No.: US 6,293,489 B1
(45) Date of Patent: Sep. 25, 2001

(54) LOCK FOR A TRUST REVERSER

(75) Inventor: Stephen Harlow Davies, Telford (GB)

(73) Assignee: Lucas Industries Limited, London (GB)

( * ) Notice: Subject to any disclaimer, the term of this patent is extended or adjusted under 35 U.S.C. 154(b) by 0 days.

(21) Appl. No.: 09/544,345

(22) Filed: Apr. 6, 2000

(30) Foreign Application Priority Data

Apr. 6, 1999 (GB) .................................................. 9907614

(51) Int. Cl.⁷ .............................. B64C 29/00; F02K 1/00
(52) U.S. Cl. ...................... 244/12.5; 244/23 D; 60/230
(58) Field of Search ................... 244/23 D, 12.5; 60/230, 39.01

(56) References Cited

U.S. PATENT DOCUMENTS

| | | | |
|---|---|---|---|
| 4,437,783 | * 3/1984 | Halin et al. | 403/27 |
| 4,754,694 | * 7/1988 | Martin | 92/5 L |
| 5,404,714 | * 4/1995 | Davies | 60/226.2 |
| 5,547,130 | * 8/1996 | Davies | 239/265.29 |
| 5,720,449 | * 2/1998 | Laboure et al. | 244/110 B |
| 5,735,557 | * 4/1998 | Harvey | 292/216 |
| 5,953,904 | * 9/1999 | Mountney | 60/226.2 |
| 5,997,054 | * 12/1999 | Baudu et al. | 292/201 |
| 6,021,636 | * 2/2000 | Johnson et al. | 60/226.2 |

FOREIGN PATENT DOCUMENTS

| | | | | |
|---|---|---|---|---|
| EP0542611 | * | 5/1993 | (FR) | F02K/1/76 |
| EP0580352 | * | 1/1994 | (GB) | F02K/1/76 |

* cited by examiner

*Primary Examiner*—Charles T. Jordan
*Assistant Examiner*—Christian M. Best
(74) *Attorney, Agent, or Firm*—Ohlandt, Greeley, Ruggiero & Perle, L.L.P.

(57) ABSTRACT

A lock for a thrust reverser comprising a retainer member carried by a pivot pin, the pivot pin being angularly moveable between a first position in which the retainer member retains a part of the thrust reverser and a second position in which the said part of the thrust reverser is not retained by the retainer member. The lock further comprises a lock arrangement for retaining the pivot pin in its first position, the lock arrangement comprising a lock member axially moveable between a locked position, in which it cooperates with the pivot pin to prevent movement of the pivot pin from its first position to its second position, and a retracted position, an arrangement for restricting angular movement of the lock member, and a solenoid actuator arranged to control movement of the lock member.

16 Claims, 1 Drawing Sheet

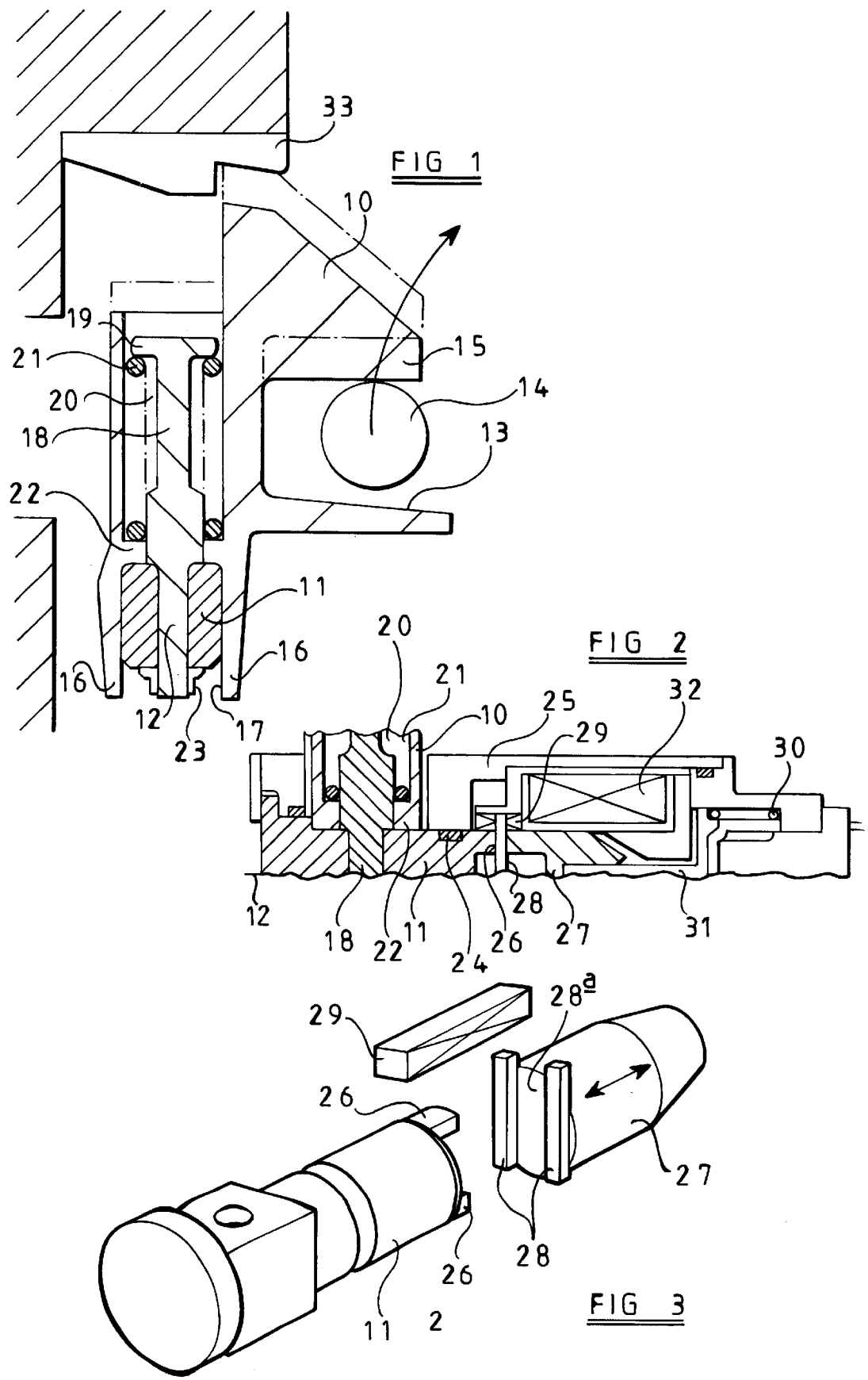

LOCK FOR A TRUST REVERSER

This invention relates to a lock for an aircraft thrust reverser intended for use in avoiding unintentional deployment of the thrust reverser. In particular, the invention relates to a tertiary lock intended to hold the thrust reverser in a non-deployed condition in the event of failure of other locks associated with the thrust reverser or the actuation system associated with those locks.

BACKGROUND OF THE INVENTION

EPA-A0580352 describes a tertiary lock for a thrust reverser which comprises a locking or retainer member in the form of a hook which is pivotable between a locked position in which a locking pin forming part of the thrust reverser is retained by the locking member and an open position in which the locking pin cam be removed from the locking member, thus deployment of the thrust reverser is permitted. A solenoid actuable bolt is moveable in a direction perpendicular to the axis of rotation and engageable with the locking member to prevent movement of the locking member away from its locked position other than when deployment of the thrust reverser is to take place.

The bolt is designed to transmit a significant load to part of the structure of the aircraft when movement of the locking member is to be avoided and as a result may be relatively large and heavy. The solenoid used to move the bolt must therefore be relatively powerful and as a consequence is large and heavy.

SUMMARY OF THE INVENTION

It is an object of the invention to provide a lock for a thrust reverser in which the provision of such a large, heavy solenoid can be avoided.

According to the present invention there is provided a lock for a thrust reverser comprising a retainer member carried by a pivot pin, the pivot pin being angularly moveable between a first position in which the retainer member retains part of the thrust reverser and a second position in which the said part of the thrust reverser is not retained by the retainer member, and a lock arrangement for retaining the pivot pin in its first position, the lock arrangement comprising a lock member axially moveable between a locked position in which it cooperates with the pivot pin to prevent movement of the pivot pin from its first position to its second position and a retracted position, means restricting angular movement of the lock member, and a solenoid actuator arranged to control movement of the lock member.

The lock member is conveniently spring biased towards its locked position, the solenoid actuator being actuable to move the lock member to its retracted position.

As the lock member is not free to move angularly, it will be appreciated that when it is in its locked position, cooperating with the pivot pin, the pivot pin is unable to move angularly, thus the said part of the thrust reverser is retained by the retainer member and deployment of the thrust reverser is not permitted. Energization of the actuator moves the lock member away from the pivot pin, thus the pivot pin is free to move. Deployment of the thrust reverser then causes the retainer member and pivot pin to move to the position in which the said part of the thrust reverser is no longer retained, the pivot pin moving to its second position.

Deployment of the thrust reverser is not prevented by the tertiary lock in these conditions.

Conveniently, the lock member is provided with formations which are cooperable with corresponding formations provided on the pivot pin so as to restrict angular movement of the lock member relative to a lock housing. The formations provided on the lock member and the corresponding formations provided on the pivot pin may take the form of a ratchet arrangement arranged such that movement of the pivot pin in the direction in which the retainer member moves is permitted regardless of whether the solenoid actuator is actuated.

The retainer member is conveniently moveable in a radial direction relative to the axis of angular movement of the pivot pin, a spring preferably being provided to bias the retainer member towards an inner radial position relative to the pivot pin. In such an arrangement, should movement of the thrust reverser towards its deployed position commence prior to the lock member moving to its retracted position, the movement of the thrust reverser causes outward radial movement of the retainer member. The retainer member moves into engagement with a stop arranged to hold the retainer member against further movement which could result in deployment of the thrust reverser being permitted. Radial movement of the retainer member may also be sensed, for example using a proximity sensor, and used to provide an indication that movement of the thrust reverser to a deployed position has been prevented by the tertiary lock, indicative of a fault in the thrust reverser deployment system or in the actuators or locks associated with the thrust reverser.

DESCRIPTION OF THE DRAWINGS

The invention will be further described, by way of example, with reference to the accompanying drawings, in which:

FIG. 1 is a sectional view illustrating a thrust reverser lock in accordance with an embodiment of the invention;

FIG. 2 is another sectional view of part of the thrust reverser lock of FIG. 1; and FIG. 3 is an exploded perspective view of parts of the thrust reverser lock of FIGS. 1 and 2.

DESCRIPTION OF THE INVENTION

The thrust reverser lock illustrated in the accompanying drawings comprises a retainer member 10 which is carried by an angularly moveable pivot pin 11 rotatable or angularly moveable about an axis 12. As shown in FIG. 1, the retainer member 10 defines a recess 13 which, in the position illustrated in FIG. 1, retains a locking pin 14 forming part of a thrust reverser system. The locking pin 14 is moveable in the direction illustrated by arrow 15 from the stowed position illustrated towards a deployed position. Clearly, with the retainer member 10 in the position illustrated in FIG. 1, if movement of the retainer member 10 is not permitted, then movement of the pin 14 to a deployed position is prevented.

The retainer member 10 includes a pair of side walls 16 which together define a recess 17 within which part of the pivot pin 11 is received. The inner surfaces of the side walls 16 which together define the recess 17 are of plane form, and extend parallel to one another, the part of the pivot pin 11 received within the recess 17 being of substantially square cross-section as illustrated in FIGS. 1 and 3. It will be appreciated that the engagement between the side walls 16 and the pivot pin 11 ensures that angular movement of the pivot pin 11 about the axis 12 is transmitted to the retainer member 10, and vice versa. Further, sliding movement of the retainer member 10 relative to the pivot pin 11 in a radial direction relative to the axis 12 is permitted, the inner surfaces of the side walls 16 sliding over the sides of the pivot pin 11.

The pivot pin 11 is provided with a drilling through which a spring abutment member 18 extends. The spring abutment member 18 takes the form of a rod including an enlarged diameter end region 19. The spring abutment member 18 extends in a radial direction relative to the axis 12, extending into a spring chamber 20 defined by part of the retainer member 10. A spring 21 is engaged between the end region 19 and a wall 22 defining the base of the spring chamber 20. It will be appreciated that the spring 21 biases the retainer member 10 towards an inner radial position shown in full lines in FIG. 1 in which the wall 22 engages the pivot pin 11, sliding movement of the retainer member 10 relative to the pivot pin 11 in a radially outward direction towards the position illustrated in broken lines in FIG. 1 being permitted, such movement requiring the spring 21 to be compressed. The spring abutment member 18 is secured to the pivot pin 11 by means of a nut 23 secured to a screw-threaded end region of the spring abutment member 18.

The pivot pin 11 is mounted for angular movement about the axis 12 relative to a part of the structure of the aircraft within which the thrust reverser lock is mounted. Conveniently, the thrust reverser lock includes a multi-part housing 25 which, in use, is secured to the structure of the aircraft, appropriate bearings and environment seals 24 being provided between the pivot pin 11 and the housing 25.

As illustrated most clearly in FIG. 3, the pivot pin 11 is shaped to define, at one end thereof, a pair of projections 26. The projections extend in a direction parallel to the axis of the pivot pin 11.

Slidable within the housing 25 is a lock member 27, the lock member 27 being coaxial with the pivot pin 11. The end of the lock member 27 closest to the pivot pin 11 is provided with a pair of integral, spaced formations 28 which are spaced apart from one another by a distance substantially equal to the width of the projections 26. The formations 28 define, therebetween, a recess 28a within which the projections 26 can be received. The formations 28 extend beyond the outer periphery of the main part of the lock member 27 and are slidable over formations 29 provided on the housing 25 to key the lock member 27 to the housing 25 such that, although axial sliding movement of the lock member 27 relative to the housing 25 and pivot pin 11 is permitted, angular movement of the lock member 27 relative to the housing 25 is substantially prevented. The lock member 27 is biased by means of a spring 30 towards the pivot pin 11, the spring loading being transmitted to the lock member 27 through a load transmitting member 31.

The housing 25 further carries a winding forming part of a solenoid actuator 32. The lock member 27 is constructed of a ferrous material and constitutes an armature which is moveable, upon energization of the solenoid actuator 32, against the action of the spring 30 to move the formations 28 out of engagement with the projections 26 formed on the pivot pin 11, the projections 26 no longer extending into the recess 28a.

In use, with the retainer member 10 in the position illustrated in full lines in FIG. 1, and with the solenoid actuator 32 de-energized, it will be appreciated that the lock member 27 occupies the position illustrated in FIG. 2, the spring 30 urging the lock member 27 to the position in which the formations 28 cooperate with the projections 26 of the pivot pin 11. As the formations 28 cooperate with the formations 29 of the housing 25, and thus the lock member 27 is unable to move angularly relative to the housing 25, it will be appreciated that the pivot pin 11 is held against angular movement. As a result, movement of the retainer member 10 about the axis 12 is not permitted. As described hereinbefore, in this position, movement of the thrust reverser to its deployed position is prevented, the pin 14 being retained within the recess 13.

When the thrust reverser is to be deployed, prior to operating the control system to cause deployment of the thrust reverser, the solenoid actuator 32 is energized, attracting the lock member 27 to move against the action of the spring 30, moving the formations 28 out of cooperation with the projections 26 of the pivot pin 11 and removing the projections 26 from the recess 28a. Once movement of the lock member 27 has taken place, it will be appreciated that the pivot pin 11 is free to move about the axis 12. Subsequent deployment of the thrust reverser will cause the pin 14 to act upon the retainer member 10, causing the retainer member 10 and pivot pin 11 to move about the axis 12 to a position in which the pin 14 is no longer retained within the recess 13, and full deployment of the thrust reverser can take place.

When the thrust reverser is to be stowed, the pin 14 of the thrust reverser will return into the recess 13 and cooperation between the pin 14 and the retainer member 10 will cause the retainer member 10 and pivot pin 11 to return to the position illustrated in FIG. 1. Once such movement of the pivot pin 11 has been completed, de-energization of the solenoid actuator 32 permits the lock member 27 to return to the position illustrated in FIG. 2 under the action of the spring 30, the formations 28 returning to the position in which they cooperate with the projections 26 to prevent angular movement of the pivot pin 11 occurring thus locking the thrust reverser in its stowed position.

In the event that, due to a fault in the thrust reverser actuation system, deployment of the thrust reverser commences without having first energized the solenoid actuator 32, the initial movement of the pin 14 will cause the retainer member 10 to move towards the position illustrated in FIG. 1 in broken lines against the action of the spring 21 angular movement of the retainer member 10 being prevented. As illustrated in FIG. 1, when the retainer member 10 reaches the position illustrated in broken lines, the retainer member 10 moves into engagement with a stop member 33 which is rigidly mounted to part of the aircraft structure. Once this position has been reached, further movement of the retainer member 10 under the action of the pin 14 is prevented. As a result, further movement of the thrust reverser towards its deployed position is not permitted. As the retainer member 10 and stop 33 are constructed to be of a robust form, it will be appreciated that failure of these components is most unlikely, and thus deployment of the thrust reverser in circumstances in which the solenoid actuator 32 has not first been energized is most unlikely to occur.

Although not illustrated in the accompanying drawings, a proximity sensor may be associated with the stop member 33, the proximity sensor being arranged to monitor the position of the retainer member 10. In the event that the retainer member 10 is moved towards the position illustrated in broken lines in FIG. 1, then the movement of the retainer member 10 will be sensed by the proximity sensor, and the output of the proximity sensor may be used to provide an indication that a fault has occurred in the thrust reverser actuation system, and that deployment of the thrust reverser is being prevented by the tertiary thrust reverser lock. Similarly, a proximity sensor may be used to monitor movement of the lock member 27 thus permitting a signal indicative of movement of the lock member 27 upon energization of the actuator and the generation of a fault signal in the event that no such movement occurs upon switching of the actuator.

It will be appreciated that the thrust reverser lock may be modified in a number of ways. For example, the projections 26 of the pivot pin 11 and the formations 28 of the lock member 27 may be modified to provide a ratchet arrangement whereby movement of the pivot pin 11 in the direction in which the retainer member 10 is being moved towards the position illustrated in FIG. 1 is permitted regardless as to whether the solenoid actuator 32 is energized. Further, it will be appreciated that the size, shape and number of projections 26 and formations 28 need not exactly match those of the arrangement illustrated in the accompanying drawings, and the manner in which angular movement of the lock member 27 relative to the housing 25 is avoided may be modified.

Further, the pivot pin 11 may be modified to be biased by a torsion spring (not shown) acting about axis 12 to maintain the retainer member 10 in the position where the locking pin is free throughout the thrust reverser cycle. This will negate the requirement for continuous energization of the solenoid coil 32. When the reverser is stowed, the locking pin will act on one side of recess 13 to rotate the locking member 10 about axis 12 overcoming the torsion spring preload to re-establish the locked position.

The thrust reverser lock of the present invention is advantageous in that the solenoid actuator 32 can be of reduced dimensions and weight, the components which must be moved by the solenoid actuator 32, in use, being relatively small and relatively lightweight. As a result, the overall weight of the thrust reverser lock can be reduced without impairing the performance of the thrust reverser lock. Further, the generation of a signal indicative of the presence of a fault condition is permitted.

What is claimed is:

1. A lock for a thrust reverser comprising a retainer member carried by a pivot pin, the pivot pin being angularly moveable between a first, locked position in which the retainer member retains a part of the thrust reverser and a second, unlocked position in which the said part of the thrust reverser is not retained by the retainer member, and a lock arrangement for retaining the pivot pin in its first, locked position, the lock arrangement comprising a lock member axially moveable between a locked position and a retracted position and cooperable with the pivot pin such that, when the lock member is in its locked position, movement of the pivot pin from its first position to its second position is prevented and, when the lock member is in its retracted position, the pivot pin is free to move, an arrangement for restricting angular movement of the lock member, and a solenoid actuator arranged to control movement of the lock member, wherein the pivot pin has an axis of angular movement about which the pivot pin moves angularly and whereby, in the event that a fault occurs in the thrust reverser system, the retainer member is moveable relative to the pivot pin in a direction perpendicular to the axis of angular movement of the pivot pin.

2. The lock as claimed in claim 1, wherein the lock member is spring biased towards its locked position, the solenoid actuator being actuable to move the lock member to its retracted position.

3. The lock as claimed in claim 2, whereby energization of the solenoid actuator moves the lock member away from the pivot pin to permit movement of the pivot pin to its second position.

4. The lock as claimed in claim 1, further comprising a spring for biasing the retainer member towards an inner radial position relative to said pivot pin.

5. The lock as claimed in claim 4, wherein the retainer member is engageable with a stop member which serves to hold the retainer member against further movement should movement of the thrust reverser towards its deployed position commence prior to the lock member moving to its retracted position.

6. The lock as claimed in claim 1, wherein the retainer member retains a locking pin forming part of the thrust reverser.

7. The lock as claimed in claim 1, further comprising a housing for the lock member wherein the lock member is provided with formations which are cooperable with corresponding formations provided on the pivot pin so as to restrict angular movement of the lock member relative to the lock housing.

8. The lock as claimed in claim 7, wherein the formations provided on the lock member and the corresponding formations provided on the pivot pin take the form of a ratchet arrangement arranged such that a movement of the pivot pin, in the direction in which the retainer member moves to the position of retaining a locking pin, is permitted regardless of whether the solenoid actuator is actuated.

9. The lock as claimed in claim 1, further comprising a sensor for monitoring the position of the retainer member.

10. The lock as claimed in claim 1, further comprising a sensor for monitoring the position of the lock member.

11. The lock as claimed in claim 9, wherein the or each sensor is arranged to provide an output signal indicative of the presence of a fault condition.

12. The lock as claimed in claim 10, wherein the or each sensor is arranged to provide an output signal indicative of the presence of a fault condition.

13. A lock for a thrust reverser comprising a retainer member carried by a pivot pin, the pivot pin being angularly moveable between a first, locked position in which the retainer member retains a part of the thrust reverser and a second, unlocked position in which the said part of the thrust reverser is not retained by the retainer member, and a lock arrangement for retaining the pivot pin in its first, locked position, the lock arrangement comprising a lock member axially moveable between a locked position and a retracted position and cooperable with the pivot pin such that, when the lock member is in its locked position, movement of the pivot pin from its first position to its second position is prevented and, when the lock member is in its retracted position, the pivot pin is free to move, an arrangement for restricting angular movement of the lock member, and a solenoid actuator arranged to control movement of the lock member, wherein the pivot pin has an axis of angular movement system, the retainer member being moveable in a radial direction relative to said axis, the lock further comprising a spring for biasing the retainer member towards an inner radial position relative the pivot pin.

14. The lock as claimed in claim 13, wherein the retainer member is engageable with a stop member which serves to hold the retainer member against further movement should movement of the thrust reverser towards its deployed position commence prior to the lock member moving to its retracted position.

15. The lock as claimed in claim 13, wherein the retainer member retains a locking pin forming part of the thrust reverser.

16. The lock as claimed in claim 13, further comprising a housing for the lock member wherein the lock member is provided with formations which are cooperable with corresponding formations provided on the pivot pin so as to restrict angular movement of the lock member relative to the lock housing.

* * * * *